March 3, 1959 S. O. ENGSTRÖM 2,876,346

CIRCUIT SYSTEM FOR DEMODULATING HIGH FREQUENCY SIGNALS

Filed Oct. 21, 1953 3 Sheets-Sheet 1

INVENTOR
STEN OSKAR ENGSTRÖM
BY [signature]
ATTORNEY

CIRCUIT SYSTEM FOR DEMODULATING HIGH FREQUENCY SIGNALS

Filed Oct. 21, 1953 3 Sheets-Sheet 2

INVENTOR
STEN OSKAR ENGSTRÖM
BY [signature]
ATTORNEY

INVENTOR
STEN OSKAR ENGSTRÖM
BY Fredrik L. Hane
ATTORNEY 2,876,346

Patented Mar. 3, 1959

2,876,346

CIRCUIT SYSTEM FOR DEMODULATING HIGH FREQUENCY SIGNALS

Sten Oskar Engström, Stockholm, Sweden, assignor to Telefonaktiebolaget L M Ericsson, Stockholm, Sweden, a corporation of Sweden Application October 21, 1953, Serial No. 387,410

Claims priority, application Sweden October 27, 1952

4 Claims. (Cl. 250—27)

The present invention relates to a system for the demodulation of high-frequency signals, comprising a carrier frequency voltage and a single sideband.

In carrier frequency transmission, using suppressed carrier current and only one side band, certain difficulties arise at the demodulation to obtain a low-frequency potential which is sufficiently free of distortion.

By transmitting also the carrier frequency and maintaining the degree of modulation very low and using a detector of square characteristic, the distortion can be made low but this involves the disadvantage, among others, that a substantial portion of the output power of the transmitter is used for the carrier frequency.

Low distortion can also be obtained by adding the carrier frequency on the receiver side, but then the carrier frequency used for the modulation must not differ more than a few cycles per second from the carrier frequency used for the demodulation. This may entail that stable—and expensive—carrier frequency oscillators must be introduced both in the transmitter and the receiver which is a great disadvantage e. g. for broadcasting.

When using the demodulation system, according to the invention, a carrier frequency voltage of the same magnitude as the voltage in the side band is sent out from the transmitter. Thus it will be possible to use the carrier frequency voltage as a pilot frequency for level regulation.

A system according to the invention is principally characterized by comprising at least two demodulators which are connected to such a common output circuit that the output potentials of the different demodulators are combined with each other in such a way that certain of the undesired demodulation signals, which are formed during the demodulation, neutralize each other and that the resulting output voltage thereby becomes practically free of distortion.

The above-mentioned demodulators can thereby be parallel connected in parallel on the input side and when using two such demodulating devices they both contain a detector of square characteristic and at least one of said devices also comprises a frequency dependent network of such a quality that the carrier frequency tension and the side band are damped at different rates.

The above-mentioned frequency dependent network can e. g. be composed of a low-pass or a high-pass filter. It can be common to the two detectors and e. g. consist of two resistances, one of which is connected in parallel with a series resonant circuit, tuned to the carrier frequency, whereby the potential across the latter resistance becomes a minimum at the carrier frequency and the potential across the other resistance becomes a maximum at the same frequency. Such a frequency dependent common network can be modified in different ways within the scope of the invention.

The output circuit from the detectors can be designed in different ways to obtain the desired resulting output tensions free of distortion, attention being paid to that the output potentials from the detectors in said circuit are combined in such a way that the difference-voltage between these potentials is formed.

The invention will be described in the following in connection with exemplifications of the same, shown on the attached drawing.

Figure 1:
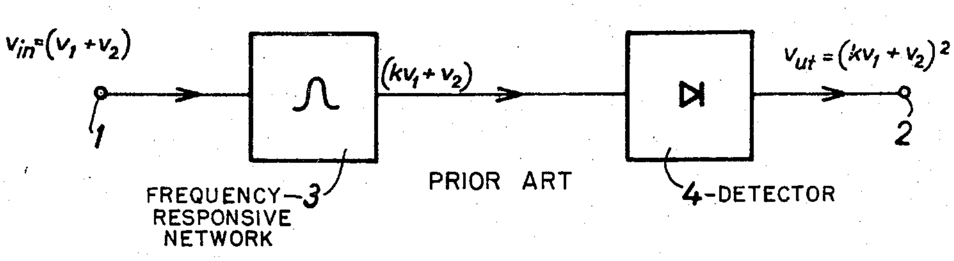
Fig. 1 shows a block diagram of a prior art demodulator device.

The prior art demodulator device, shown in Fig. 1, in which the distortion is reduced by reducing the degree of modulation immediately before the detector, will first be briefly described in the following. Disregarding the difficulty to obtain sufficiently low distortion, disadvantages in respect to the level regulation will be encountered with this demodulator.

In the figure, $v_1$ indicates the carrier-frequency voltage and $v_2$ the side band voltage. The input voltage, $v_{in}=v_1+v_2$ is at 1 applied to a frequency dependent network 3, which damps the side band more than the carrier frequency. The output voltage from the network 3, which is equal to $(kv_1+v_2)$, is applied to a detector 4 which has a square characteristic and this detector delivers at the output 2 a voltage $$v_{ut}=(kv_1+v_2)^2$$

The constants indicating the efficiency of the different devices have been omitted from the above-mentioned expressions for the different potentials. In spite of this, the ratio between the different components in the output tension $v_{ut}$ will naturally be correct.

The output potential obtained at the point 2 can evidently be written $$v_{ut}=(kv_1+v_2)^2=k^2v_1^2+v_2^2+2kv_1v_2$$

If one assumes that the side band contains two frequencies, one can write:

$$v_1=V_1 \sin w_1t$$
$$v_2=V_2 \sin w_2t+V_3 \sin w_3t$$

which gives:

$$v_{ut}=k^2V_1^2 \sin^2 w_1t+V_2^2 \sin^2 w_2t+ V_3^2 \sin^2 w_3t+2V_2V_3 \sin w_2t \cdot \sin w_3t + 2kV_1V_2 \sin w_1t \cdot \sin w_2t+2kV_1V_3 \sin w_1t \cdot w_3t$$

Evidently this expression contains terms of different sum—and difference—frequencies. Divided according to the different frequencies, the following relative amplitudes are obtained

| Frequency: | Amplitude |
|---|---|
| 0 (direct current) | $\frac{1}{2}K^2V_1^2+\frac{1}{2}\cdot V_2^2+\frac{1}{2}\cdot V_3^2$. |
| $2w_1$ (double carrier frequency) | $\frac{1}{2}K^2V_1^2$. |
| $2w_2$ | $\frac{1}{2}V_2^2$. |
| $2w_3$ | $\frac{1}{2}V_3^2$. |
| $w_1-w_2$ (low frequency) | $kV_1\cdot V_2$. |
| $w_1+w_2$ | $k\cdot V_1\cdot V_2$. |

| Frequency: | Amplitude |
|---|---|
| $w_1-w_3$ (low frequency) | $k-V_1\cdot V_3$. |
| $w_1+w_3$ | $k\cdot V_1\cdot V_3$. |
| $w_2-w_3$ (low frequency) | $V_2\cdot V_3$. |
| $w_2+w_3$ | $V_2\cdot V_3$. |

The frequencies $(w_1-w_2)$ and $(w_1-w_3)$ are desired low frequencies. The frequency $(w_2-w_3)$ is an undesired low frequency, causing distortion.

If the distortion voltage is compared with the desired voltage, a measure of the distortion is obtained:

$$d=\frac{V_2\cdot V_3}{k\cdot V_1\cdot V_2+k\cdot V_1 V_3}=\frac{V_2\cdot V_3}{kV_1(V_2+V_3)}$$

The distortion evidently decreases with increasing $k$. It is difficult in practice to make a frequency dependent network with higher $k$-value than $k=2$.

If this $k$-value is inserted and if one further assumes that the degree of modulation is 100% and that $V_2=V_3$, that is $$V_2=V_3=\tfrac{1}{2}V_1$$

one obtains:

$$d=\frac{\tfrac{1}{4}\cdot V_1^2}{2\cdot V_1\cdot V_1}=\tfrac{1}{8}$$

This distortion is too high to give a high quality reception.

In order to govern the level regulation, double carrier frequency is the only possible component. The gain of the receiver will then vary according to $$F=\frac{\alpha}{\tfrac{1}{2}k^2V_1^2}$$

in which $\alpha$ is a constant.

The low frequency output voltage of the frequency $(w_1-w_2)$, which is obtained after level regulation, can then be written:

$$V_{ut}=\beta\cdot\frac{k\cdot V_1\cdot V_2}{\tfrac{1}{2}k^2\cdot V_1^2}=2\beta\cdot\frac{V_2}{V_1}\cdot\frac{1}{k}$$

in which $\beta$ is another constant.

If the carrier frequency drives in relation to the frequency dependent network (which is possible particularly as this network must be made rather selective) $v_{ut}$ will consequently be changed, since the constant $k$ changes.

Figure 2:
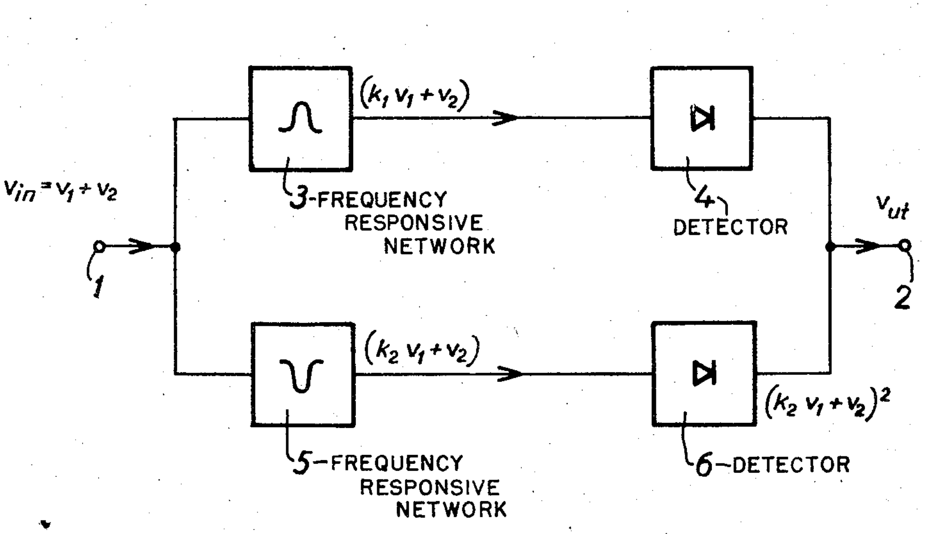
Fig. 2 shows a block diagram of a system made according to the invention, containing two demodulator branches connected in parallel.

In Fig. 2 is shown a block scheme of a demodulator device, which gives considerably less distortion than the device shown in Fig. 1 and which at the same time is better with regard to level regulation. The device in Fig. 2 comprises an upper demodulator branch, containing the frequency dependent network 3 and the detector 4, and a lower branch containing the frequency dependent network 5 and the detector 6, which two branches are connected to a common input 1 and a common output 2.

As in Fig. 1 an input tension $v_{in}=v_1+v_2$ is applied to the input 1. From the frequency dependent network 3 a potential is obtained which is equal to $(k_1v_1+v_2)$, and from the network 5 a potential equal to $(k_2v_1+v_2)$, which potentials are applied to detectors 4 and 6 respectively, which in their turn supply the output potentials $(k_1v_1+v_2)^2$ and $(k_2v_1+v_2)^2$ respectively. The latter potentials are combined in the common output circuit so that from this is obtained a resulting output voltage $v_{ut}=(k_1v_1+v_2)^2-(k_2v_1+v_2)^2$. Thus one evidently obtains:

$$v_{ut}=(k_1v_1+v_2)^2-(k_2v_1+v_2)^2=(k_1^2-k_2^2)v_1^2+2(k_1-k_2)v_1\cdot v_2$$

If one substitutes:

$$v_1=V_1 \sin w_1t$$
$$v_2=V_2 \sin w_2t+V_3 \sin w_3t$$

one obtains:

$$v_{ut}=(k_1^2-k_2^2)\cdot v_1^2 \sin^2 w_1t+2(k_1-k_2)V_1V_2 \sin w_1t\cdot \sin w_2t+2(k_1-k_2)V_1\cdot V_3 \sin w_1t\cdot \sin w_3t$$

If divided according to different frequencies, the following relative amplitudes are obtained in this case:

| Frequency: | Amplitude |
|---|---|
| 0 (direct current) | $\tfrac{1}{2}(k_1^2-k_2^2)V_1^2$. |
| $2w_1$ (double carrier frequency) | $\tfrac{1}{2}(k_1^2-k_2^2)V_1^2$. |
| $w_1-w_2$ (low frequency) | $(k_1-k_2)\cdot V_1\cdot V_2$. |
| $w_1+w_2$ | $(k_1-k_2)\cdot V_1\cdot V_2$. |
| $w_1-w_3$ (low frequency) | $(k_1-k_2)\cdot V_1\cdot V_3$. |
| $w_1+w_3$ | $(k_1-k_2)\cdot V_1\cdot V_3$. |

This demodulator therefore gives a smaller number of undesired products. It is of greatest importance that the frequency $(w_2-w_3)$ is missing. In other words theoretically no distortion is obtained within the low frequency band.

In order to control the level regulation either the D. C. component or the double carrier frequency can be used here.

If the frequency dependent networks are dimensioned in such a way that $k_1+k_2$=constant one obtains in conformity with the case discussed above in connection with Fig. 1:

$$v_{ut}=\beta\cdot\frac{(k_1-k_2)\cdot V_1\cdot V_2}{\tfrac{1}{2}\cdot(k_1^2-k_2^2)V_1^2}=2\beta\frac{V_2}{V_1}\cdot\frac{1}{k_1+k_2}$$

Consequently the output potential remains constant even if the carrier frequency drives, because $(k_1+k_2)$ then does not change.

Figure 3:
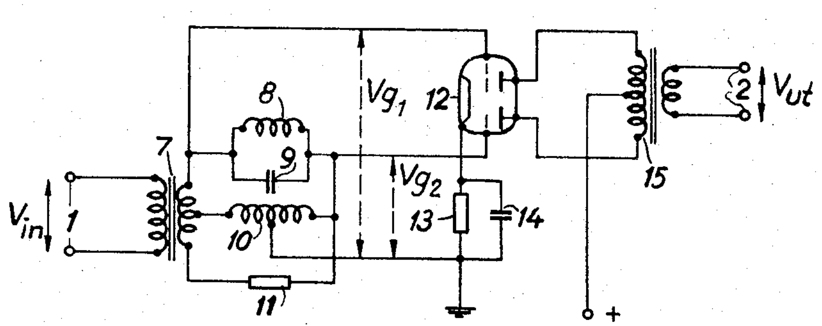
Fig. 3 shows more in detail a demodulator according to the invention.

A demodulator device according to the principle described in connection with Fig. 2 is shown in Fig. 3. 1 and 2 indicates the input and output respectively. The detector device is composed of a vacuum tube, the twin triode tube 12, a resistance 13 and a condenser 14. The operating point of the tube 12 is by the resistance 13 located at the square part of the characteristic. This tube can be replaced by some other type of vacuum tube or rectifier. The output circuit consists of a transformer 15, to primary winding of which is provided with a center-tap, and the plates in the tube 12 are connected to either end of the primary winding of this transformer. The output tension $v_{ut}$ is obtained across the terminal pair designated 2. If the second harmonic of the carrier frequency is to be used for the purpose of level regulation, two transformers may be necessary, one for low and one for high frequencies or some other differential coupling.

The selective network consists of the input transformer 7, a parallel-resonance circuit, comprising the inductance coil 8 and the condenser 9 tuned to the carrier frequency. Further, the network comprises a center-tapped inductance coil 10 of great reactance as compared with the inductance coil 8, and a resistance 11 for balancing the losses in the circuit 8–10. The secondary winding of the input transformer 7 is provided with a center tap to which the inductance coil 10 is connected. The parallel-resonance circuit 8, 9 is connected to one end of said secondary winding and the resistance 11 is connected to the other end. The other end of the coil 10 is connected to the point which is common to the parallel-resonance circuit 8, 9 and the resistance 11.

The grid biases for the two halves $v_{g1}$ and $v_{g2}$ of the tube 12 are obtained between one end of the secondary winding and the center tap of the coil 10 and between this center-tap and the common point of the parallel-resonance circuit and the coil 10 respectively.

Figure 4:
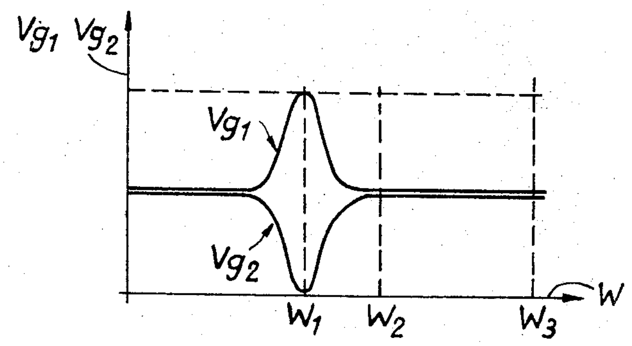
Fig. 4 shows the output potentials from the selective network in the device shown in Fig. 1 as a function of the frequency.

If the amplitude of the input tension $v_{in}$ for the device shown in Fig. 3 is kept constant but its frequency is varied, the grid biases $v_{g1}$ and $v_{g2}$ will vary according to Fig. 4. In this figure the received carrier frequency is designated $w_1$, that is the resonance-frequency in the circuit 8, 9, 10 in Fig. 3. $w_2$ and $w_3$ indicate two frequencies within the side band. According to what has been said above in connection with Fig. 2 one obtains $k_1=2$ and $k_2=0$ for the carrier frequency $w=w_1$. Furthermore $k_1+k_2\cong$constant=2 for varying $w$.

According to the above, the following relative amplitudes will then be obtained in the output circuit:

| Frequency | Amplitude |
|---|---|
| 0 (direct current) | $2V_1^2$ |
| $2w_1$ (double carrier frequency) | $2V_1^2$ |
| $w_1-w_2$ (low frequency) | $2\cdot V_1\cdot V_2$ |
| $w_1-w_3$ (low frequency) | $2\cdot V_1\cdot V_3$ |

Theoretically, no other tensions than the above-mentioned will be obtained within the low frequency band. It appears from the above that this is due to the fact that a certain part of the square term of the output tension from one detector (one triode part) is compensated by the output tension from the other detector (the other triode part).

Figure 5:
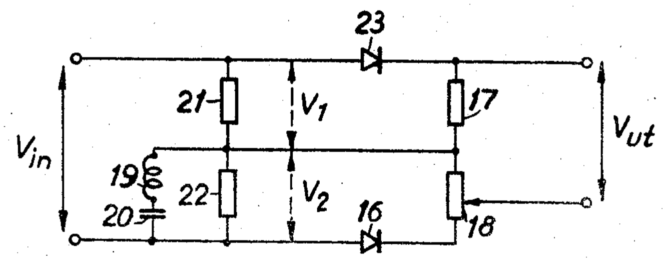
Fig. 5 shows a modification of the system according to the invention.

Fig. 5 shows another design which essentially functions in like manner as the design described above, but where the detection takes place in two rectifiers or potential dependent resistances of suitable characteristic.

19–20 in Fig. 5 constitute a series resonance circuit, the resonance frequency of which is equal to the received carrier frequency $w_1$. 21 and 22 indicate two resistances, which form a selective network together with the series resonance circuit. 16 and 23 are rectifier or potential dependent resistances, forming part of the detector devices. Two resistances, forming part of the output circuit and across which the output voltage $v_{ut}$ is delivered, are shown at 17 and 18.

Figure 6:
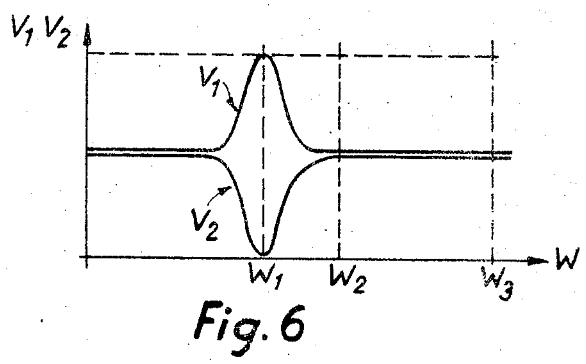
Fig. 6 shows a diagram, analogous to that in Fig. 4, of the system shown in Fig. 5.

If the input voltage $v_{in}$ is kept constant as to amplitude but varies in frequency, the currents $v_1$ and $v_2$ which are applied to respective detector devices, will vary in the manner shown in Fig. 6. In this case the same relative amplitudes are obtained in the output circuit as in the system described in connection with Figs. 3 and 4.

Figure 7:
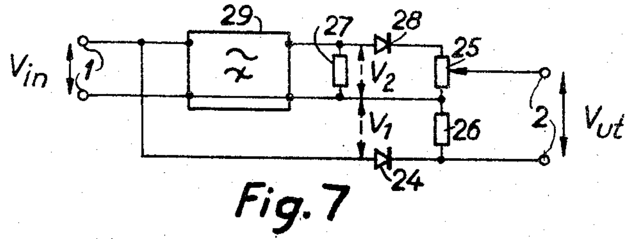
Fig. 7 shows a further modification of the system according to the invention.

Fig. 7 shows an additional system according to the invention wherein 29 indicates a high-pass filter loaded with the resistance 27. 24 and 28 indicate two rectifiers or voltage dependent resistors. 25 and 26 indicate two resistances across which the output voltage $v_{ut}$ is delivered in conformity to the output circuit in Fig. 5. In Figs. 5 and 7 is shown that the desired degree of freedom of distortion can be manually adjusted across the resistances 18 and 25 respectively.

Figure 8:
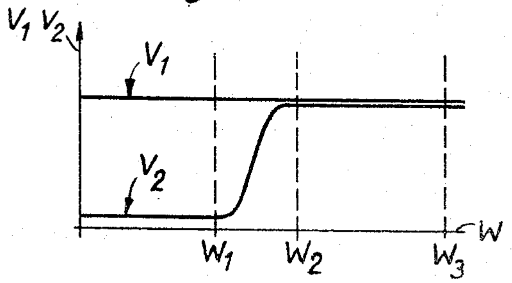
Fig. 8 shows a diagram, analogous to those in Figs. 4 and 6, of the system shown in Fig. 7.

In Fig. 8 is shown how the voltages $v_1$ and $v_2$, which are applied to respective detector device within the device in Fig. 7, vary with the frequency. In this event one obtains:

$$k_1=1 \quad \text{for } w=w_1$$
$$k_2=0 \quad \text{for } w=w_1$$

The following relative amplitudes are then obtained in the output circuit:

| Frequency | Amplitude |
|---|---|
| 0 (direct current) | $\frac{1}{2}V_1^2$ |
| $2w_1$ (double carrier frequency) | $\frac{1}{2}V_1^2$ |
| $w_1-w_2$ (low frequency) | $V_1\cdot V_2$ |
| $w_1-w_3$ (low frequency) | $V_1\cdot V_2$ |

The invention is not limited to the designs shown and described above and particularly Figs. 3, 5 and 7 are only to be considered as examples of how a device according to the principle shown in Fig. 2 can be designed in practice. It is also evident that the frequency dependent networks in the different figures can partly be modified by the inversion of the component parts and can partly be combined in other ways with the output circuits and that the output circuits shown can be combined with other frequency dependent networks than those shown in detail.

I claim:

1. A circuit system for demodulating high frequency signals including a carrier frequency and at least one side band, comprising at least two demodulating means each including a detector means having a square characteristic, a frequency responsive network common to both detector means, said network including an input transformer having a center tapped secondary winding, a parallel resonance circuit tuned to the carrier frequency and including in series a resistance means connected across the terminals of said secondary winding, said resonance circuit having input and output terminals, inductance coil means having a grounded center tap, said coil means being connected between said center tap of the secondary winding and the junction point between said resonance circuit and said resistance means, said two detector means comprising electron tube means having plural anode means, cathode means and plural control grid means, the input and output terminals of said resonance circuit being each connected to said plural grid means, circuit means including a resistance means and a capacitance means connecting said plural cathode means to ground, and an output transformer means, said anode means being connected across the terminals of the primary winding of said output transformer means.

2. A circuit system for demodulating high frequency signals including a carrier frequency and at least one side band, comprising at least two demodulating means each including a detector means having a square characteristic, a frequency responsive network common to both detector means, said network including an input transformer having a center tapped secondary winding, a parallel resonance circuit tuned to the carrier frequency and including in series a resistance means connected across the terminals of said secondary winding, inductance coil means having a grounded center tap, said coil means being connected between said center tap of the secondary winding and the junction point between said resonance circuit and said resistance means, said two detector means comprising a dual triode having a common cathode, two control grids and two anodes, each of said grids being connected to one of the terminals of the resonance circuit and the cathode being connected to ground in a circuit including a resistance means and a capacitance means connected in parallel, and an output transformer, each of said anodes being connected to one terminal of the primary winding of said output transformer.

3. A circuit system according to claim 2, wherein the primary winding of the output transformer is center tapped.

4. A circuit system according to claim 2, wherein each half of said dual triode constitutes one of said detector means.

References Cited in the file of this patent

UNITED STATES PATENTS

| | | |
|---|---|---|
| 1,947,569 | Posthumus | Feb. 20, 1934 |
| 2,095,998 | McNary | Oct. 19, 1937 |
| 2,178,552 | Barger et al. | Nov. 7, 1939 |
| 2,181,469 | Barber | Nov. 28, 1939 |
| 2,187,978 | Lewis | Jan. 23, 1940 |
| 2,397,961 | Harris | Apr. 9, 1946 |
| 2,641,695 | Lovell | June 9, 1953 |